(12) United States Patent
Nouchi et al.

(10) Patent No.: US 7,667,786 B2
(45) Date of Patent: Feb. 23, 2010

(54) CURVED LIQUID-CRYSTAL DISPLAY DEVICE AND BACKLIGHT USED FOR CURVED LIQUID-CRYSTAL DISPLAY DEVICE

(75) Inventors: Masanori Nouchi, Yokohama (JP); Fumitoshi Matsuda, Yokohama (JP); Hiromitsu Hashiba, Yamato (JP)

(73) Assignee: Infovision Optoelectronics Holdings Limited, Tortola (VG)

( * ) Notice: Subject to any disclaimer, the term of this patent is extended or adjusted under 35 U.S.C. 154(b) by 509 days.

(21) Appl. No.: 11/424,548

(22) Filed: Jun. 16, 2006

(65) Prior Publication Data

US 2007/0146569 A1    Jun. 28, 2007

(30) Foreign Application Priority Data

Dec. 22, 2005   (JP) .............................. 2005-370700

(51) Int. Cl.
    *G02F 1/1333*   (2006.01)
    *G02F 1/1335*   (2006.01)
(52) U.S. Cl. .......................................... 349/58; 349/64
(58) Field of Classification Search ................. 349/158, 349/56, 58, 62, 64, 112, 113; 362/225, 611, 362/216, 612
    See application file for complete search history.

(56) References Cited

U.S. PATENT DOCUMENTS

| 5,307,190 | A | * | 4/1994 | Wakita et al. ............... 349/158 |
| 5,537,235 | A | * | 7/1996 | Ishihara et al. .............. 349/155 |
| 5,555,160 | A | * | 9/1996 | Tawara et al. ............... 362/613 |
| 5,648,827 | A | * | 7/1997 | Shaw ........................... 349/61 |
| 6,621,766 | B2 | * | 9/2003 | Brewer et al. .................. 368/82 |
| 7,188,989 | B2 | * | 3/2007 | Miyashita ..................... 362/621 |
| 2004/0130912 | A1 | * | 7/2004 | Miyashita ..................... 362/561 |
| 2005/0128771 | A1 | | 6/2005 | Tanaka ........................ 362/613 |
| 2007/0146569 | A1 | * | 6/2007 | Nouchi et al. .................. 349/58 |

FOREIGN PATENT DOCUMENTS

| CN | 1612185 A | 5/2005 | |
| JP | 2005-150056 | 6/2005 | ................. 362/613 |

* cited by examiner

*Primary Examiner*—Brian M Healy

(57) ABSTRACT

Backlight with which the uniformity of brightness within a display area of a concavely curved liquid crystal display device is improved while fulfilling the demand for slimmer liquid-crystal display devices, as well as curved liquid-crystal display device including such a backlight. The shape of a frame, an optical sheet, and a scattering plate constituting the backlight unit is the same concavely curved shape as that of the concavely curved panel; and the liquid-crystal panel, the optical sheet, and cold-cathode luminescent lamps are arranged such that the concavely curved panel, the surface of a frame constituting the backlight unit that faces the concavely curved panel, an optical sheet surface, and a surface including the tube center axes of a plurality of cold-cathode luminescent lamps are parallel to each other.

11 Claims, 13 Drawing Sheets

CURVED LIQUID-CRYSTAL DISPLAY DEVICE AND BACKLIGHT USED FOR CURVED LIQUID-CRYSTAL DISPLAY DEVICE

BACKGROUND OF THE INVENTION

1. Technical Field

The present invention relates to curved liquid-crystal display devices and to backlights used for curved liquid-crystal display devices.

2. Description of the Related Art

In recent years, as liquid crystal display devices have come to be used as display devices of television receivers, the screens of such liquid crystal display devices have become increasingly bigger. But a problem with increasingly larger television LCD screens is that the viewing angle difference between the viewing angle when the viewer views the center portion of the screen and the viewing angle when the viewer views the left and right edges of the screen increases (throughout this specification, the technical term "viewing angle" is defined as the angle between the line of sight of the viewer viewing the screen and the tangent to the intersection between the line of sight and the observed screen surface, and the difference between the center and left/right edge viewing angles is defined as and used to mean the "viewing angle difference").

Furthermore, another problem with large-scale television LCD screens is that glare off the screens also increases. The problem of difference in viewing angle can be corrected by curving the screen into a concave shape.

However, even when the viewing angle difference is improved by a liquid-crystal panel with a concavely curved screen (referred to as "concavely curved liquid-crystal panel" below), when using a backlight with the same structure as that of a conventional flat liquid-crystal panel for such a concavely curved liquid-crystal panel, there is the problem that the uniformity of light that is emitted from the light source inside the backlight is lost in particular at the peripheral edges of the concavely curved liquid-crystal panel. As a result, the image quality of the concavely curved liquid-crystal panel becomes lower than that of the screen of a conventional flat liquid-crystal display device.

As a countermeasure for solving this problem and using the backlight for a conventional flat liquid-crystal panel is to enlarge the space in which the light source of the backlight is arranged.

This countermeasure will be explained with reference to FIG. 8.

FIG. 8A is a diagrammatic cross-sectional view illustrating the relation between the line of sight of a viewer observing the two edges of a concavely curved liquid-crystal panel and the horizontal width of the backlight. FIG. 8B is a diagrammatic cross-sectional view illustrating the relation between the line of sight of a viewer observing the two edges of a liquid-crystal panel and the horizontal width of the backlight for the case that also the backlight is concavely curved.

At the edge portion 802 of the concavely curved liquid-crystal panel in FIG. 8A, there are no light rays of direct light reaching the eye of the viewer after from the backlight passing through the edge portion 802. Therefore, the brightness of the screen at the corner portion 802 becomes lower.

If the horizontal width w3 of the backlight is broadened to w4 as a countermeasure, then it is possible to attain light rays 801 of direct light reaching the eye of the viewer after passing from the backlight through the edge portion 802 and thus to improve the brightness at the edge portion 802.

However, this countermeasure makes the outer shape of the liquid-crystal display device bigger, and thus stands in the way of fulfilling the demand of making the display device slimmer. On the other hand, as shown in FIG. 8B, if the backlight itself is provided with a concavely curved shape matching the shape of the concavely curved liquid-crystal panel, then it is possible to attain light rays 801 of direct light reaching the eye of the viewer from the curved backlight without broadening the horizontal width of the backlight, and thus to improve the brightness at the edge portion 802.

(See JP 2005-150056A.)

BRIEF SUMMARY OF THE INVENTION

Accordingly, it is an object of the present invention to provide a backlight with which the uniformity of brightness within a display area of a concavely curved liquid crystal display device is improved while fulfilling the demand for slimmer display devices, as well as a curved liquid-crystal display device including such a backlight.

As a result of examining and comparing the shapes of, particularly, backlight units, optical sheets and light sources in order to address the above-mentioned problems, it was found that it is advantageous that the backlight unit, the optical sheet and the light source have the same concavely curved shape as the liquid-crystal panel.

Accordingly, in a direct backlight unit for a liquid-crystal display device having a concavely curved panel according to a first aspect of the present invention, a light source of the direct backlight unit is a surface light source; and the surface light source is arranged to be parallel to the concavely curved panel.

In a direct backlight unit for a liquid-crystal display device having a concavely curved panel according to a second aspect of the present invention, a light source of the direct backlight unit is a surface light source; a surface shape of a frame, an optical sheet, a scattering plate, a reflective sheet and the surface light source constituting the direct backlight unit is substantially the same concavely curved shape as that of the concavely curved panel; and the concavely curved panel, the direct backlight unit's frame, the optical sheet, the scattering plate, the reflective sheet and the surface light source are parallel to each other.

In a direct backlight unit for a liquid-crystal display device having a concavely curved panel according to a third aspect of the present invention, a light source of the direct backlight unit comprises a plurality of cold cathode luminescent lamps; and a surface including tube center axes of the cold cathode luminescent lamps is parallel to the concavely curved panel.

In a direct backlight unit for a liquid-crystal display device having a concavely curved panel according to a fourth aspect of the present invention, a light source of the direct backlight unit comprises a plurality of cold cathode luminescent lamps; the shape of a frame, an optical sheet, a scattering plate and a reflective sheet constituting the direct backlight unit is substantially the same concavely curved shape as that of the concavely curved panel; and the concavely curved panel, the direct backlight unit's frame, the optical sheet, the scattering plate, the reflective sheet and a surface including tube center axes of the cold cathode luminescent lamps are parallel to each other.

According to a fifth aspect of the present invention, in a direct backlight unit for a liquid-crystal display device according to the third aspect, the cold cathode luminescent lamps have a straight tubular shape; and the cold cathode luminescent lamps are arranged parallel to lateral edges of the concavely curved panel that are not curved.

According to a sixth aspect of the present invention, in a direct backlight unit for a liquid-crystal display device according to the fourth aspect, the cold cathode luminescent lamps have a straight tubular shape; and the cold cathode luminescent lamps are arranged parallel to lateral edges of the concavely curved panel that are not curved.

According to a seventh aspect of the present invention, in a direct backlight unit for a liquid-crystal display device according to the third aspect, the cold cathode luminescent lamps are U-shaped; and the cold cathode luminescent lamps are arranged parallel to lateral edges of the concavely curved panel that are not curved.

According to an eighth aspect of the present invention, in a direct backlight unit for a liquid-crystal display device according to the fourth aspect, the cold cathode luminescent lamps are U-shaped; and the cold cathode luminescent lamps are arranged parallel to lateral edges of the concavely curved panel that are not curved.

According to a ninth aspect of the present invention, in a direct backlight unit for a liquid-crystal display device according to the third aspect, the cold cathode luminescent lamps are curved like the concavely curved panel, and arranged parallel to lateral edges of the concavely curved panel that are curved.

According to a tenth aspect of the present invention, in a direct backlight unit for a liquid-crystal display device according to the fourth aspect, the cold cathode luminescent lamps are curved like the concavely curved panel, and arranged parallel to lateral edges of the concavely curved panel that are curved.

In a direct backlight unit for a liquid-crystal display device having a concavely curved panel according to an eleventh aspect of the present invention, a light source of the direct backlight unit is an LED surface light source; and the LED surface light source is parallel to the concavely curved panel.

In a direct backlight unit for a liquid-crystal display device having a concavely curved panel according to a twelfth aspect of the present invention, a light source of the direct backlight unit is an LED surface light source; the shape of a frame, an optical sheet, a scattering plate, a reflective sheet and the LED surface light source constituting the direct backlight unit is substantially the same concavely curved shape as that of the concavely curved panel; and the concavely curved panel, the direct backlight unit's frame, the optical sheet, the scattering plate, the reflective sheet and the LED surface light source are parallel to each other.

According to a thirteenth aspect of the present invention, in a direct backlight unit according to the first aspect, the surface light source is made of a xenon lamp.

According to a fourteenth aspect of the present invention, in a direct backlight unit according to the second aspect, the surface light source is made of a xenon lamp.

According to a fifteenth aspect of the present invention, in a direct backlight unit according to any of the first to fourteenth aspects, a portion of a bezel of the liquid-crystal display device having the concavely curved panel, the portion holding an uncurved lateral edge of the concavely curved panel, is curved with the same shape as the concavely curved panel.

In a side backlight unit for a liquid-crystal display device having a concavely curved panel according to a sixteenth aspect of the present invention, a light source of the side backlight unit comprises a cold cathode luminescent lamp; the shape of a frame, an optical sheet, a scattering plate, a reflective sheet and a light-conductive plate constituting the backlight unit is substantially the same concavely curved shape as that of the concavely curved panel; the cold cathode luminescent lamp is a straight tubular cold cathode luminescent lamp that is arranged at a side portion of the light-conductive plate; and the concavely curved panel, the direct backlight unit's frame, the optical sheet, the scattering plate, the reflective sheet and the light-conductive plate are parallel to each other.

In a side backlight unit for a liquid-crystal display device having a concavely curved panel according to a seventeenth aspect of the present invention, a light source of the side backlight unit comprises a planar LED surface light source; a shape of a frame, an optical sheet, a scattering plate, a reflective sheet and a light-conductive plate constituting the backlight unit is substantially the same concavely curved shape as that of the concavely curved panel; the planar LED surface light source is arranged at a side portion of the light-conductive plate; and the concavely curved panel, the backlight unit's frame, the optical sheet, the scattering plate, the reflective sheet and the light-conductive plate are parallel to each other.

A liquid-crystal display device having a concavely curved panel according to the eighteenth aspect of the present invention comprises a backlight unit for a liquid-crystal display device according to any of the first to fourteenth, sixteenth and seventeenth aspects.

With the first aspect of the present invention, the screen is concavely curved, and whereas the problem that brightness non-uniformities occurs when an ordinary flat backlight unit is used, the brightness non-uniformities can be improved without increasing the outer dimensions of the liquid-crystal display device.

With the second aspect of the present invention, by setting the shape of the frame, the optical sheet, the scattering plate, the reflective sheet and the surface light source of the backlight unit to a similar curved shape as that of the liquid-crystal panel, and arranging the aforementioned components to be parallel to each other, the distance from the light source to the liquid-crystal panel becomes equivalent, and even when the screen is curved, the brightness non-uniformities of the screen can be improved without increasing the outer dimensions of the liquid-crystal display device.

With the third aspect of the present invention, using a plurality of cold cathode luminescent lamps and arranging the surface including the tube center axes of the cold cathode luminescent lamps to be parallel to the liquid-crystal panel, the distance from the cold cathode luminescent lamps serving as the light source to the liquid-crystal panel becomes equivalent, and even when the screen is curved, the brightness non-uniformities of the screen can be improved without increasing the outer dimensions of the liquid-crystal display device.

With the fourth aspect of the present invention, using a plurality of cold cathode luminescent lamps and arranging the surface including the tube center axes of the cold cathode luminescent lamps to be parallel to the liquid-crystal panel, the same effect as with the second aspect of the present invention can be attained.

With the fifth aspect of the present invention, using ordinary straight tubular cold cathode luminescent lamps, the same effect as with the third aspect of the present invention can be attained.

With the sixth aspect of the present invention, using ordinary straight tubular cold cathode luminescent lamps, the same effect as with the fourth aspect of the present invention can be attained.

With the seventh aspect of the present invention, using U-shaped cold cathode luminescent lamps, the same effect as with the third aspect of the present invention can be attained.

With the eighth aspect of the present invention, using U-shaped cold cathode luminescent lamps, the same effect as with the fourth aspect of the present invention can be attained.

With the ninth aspect of the present invention, curving the cold cathode luminescent lamps themselves like the liquid-crystal panel and arranging the lamps parallel to the curved edges of the liquid-crystal panel, the same effect as with the third aspect of the present invention can be attained.

With the tenth aspect of the present invention, curving the cold cathode luminescent lamps themselves like the liquid-crystal panel and arranging the lamps parallel to the curved edges of the liquid-crystal panel, the same effect as with the fourth aspect of the present invention can be attained.

With the eleventh aspect of the present invention, using an LED surface light source as the light source, the same effect as with the first aspect of the present invention can be attained, and furthermore, the effect of energy savings can be attained.

With the twelfth aspect of the present invention, using an LED surface light source as the light source, the same effect as with the second aspect of the present invention can be attained, and furthermore, the effect of energy savings can be attained.

With the thirteenth aspect of the present invention, using a xenon lamp as the light source, the same effect as with the first aspect of the present invention can be attained.

With the fourteenth aspect of the present invention, using a xenon lamp as the light source, the same effect as with the second aspect of the present invention can be attained.

With the fifteenth aspect of the present invention, the same effect as with any of the first to fourteenth aspect of the present invention can be attained.

With the sixteenth aspect of the present invention, the same effect as with the second aspect of the present invention can also be attained with a side backlight unit.

With the seventeenth aspect of the present invention, in addition to the effect of energy savings, the same effect as with the sixteenth aspect of the present invention can also be attained with a side backlight unit using an LED surface light source as the light source.

With the eighteenth aspect of the present invention, the same effect as with any of the first to fourteenth, sixteenth and seventeenth aspect of the present invention can be attained.

DETAILED DESCRIPTION OF THE INVENTION

Referring to the accompanying drawings, the following is explanation of preferred embodiments of the invention.

EMBODIMENT 1

Figure 1:
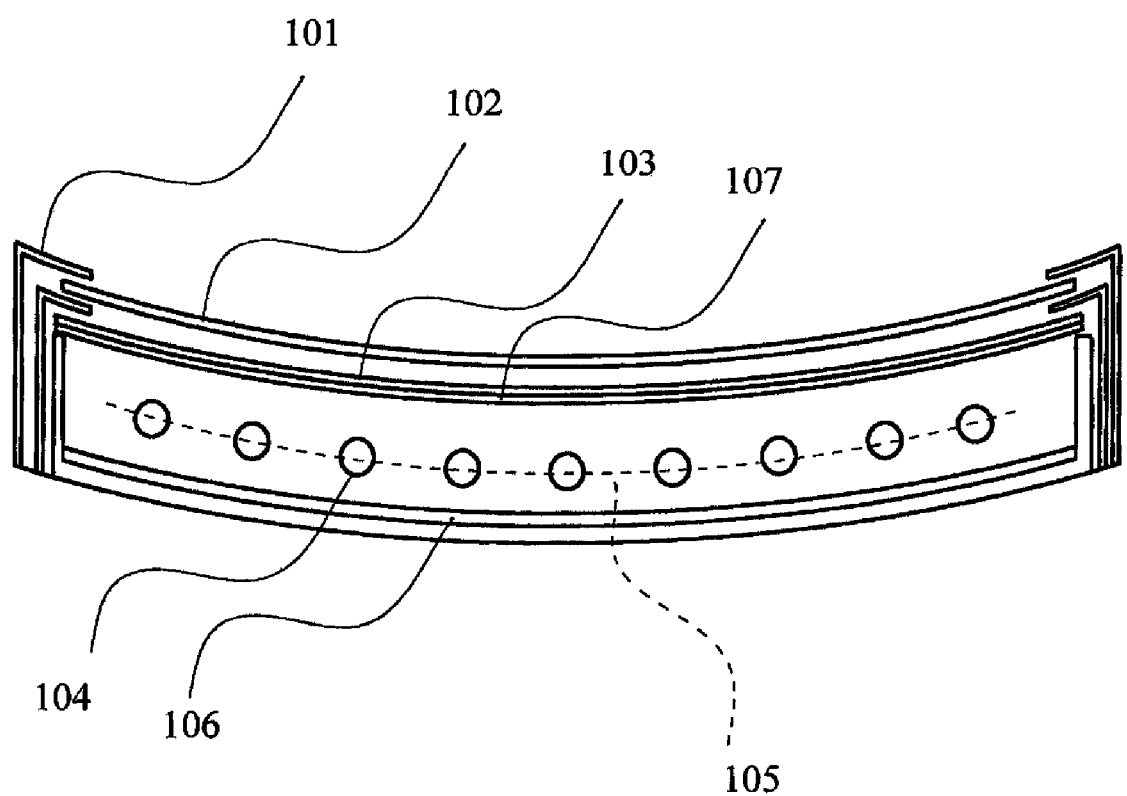
FIG. 1 is a diagrammatic sectional view illustrating the structure of a backlight for a liquid-crystal display device having a concavely curved panel according to Embodiment 1.

FIG. 1 is a diagrammatic sectional view illustrating the structure of a direct backlight for a liquid-crystal display device having a concavely curved panel according to Embodiment 1.

In FIG. 1, numeral 101 denotes a bezel, numeral 102 denotes a liquid-crystal panel, numeral 103 denotes an optical sheet, numeral 104 denotes cold cathode luminescent lamps, numeral 107 denotes a scattering plate, numeral 106 denotes a reflective sheet and numeral 105 denotes a surface including the tube center axes of the cold cathode luminescent lamps. It should be noted that the cold cathode luminescent lamps 104 have a straight tubular shape in the present embodiment. The arrangement of the liquid-crystal panel 102, the optical sheet 103, the scattering plate 107 and the cold cathode luminescent lamps 104 is explained using an exploded view.

Figure 2:
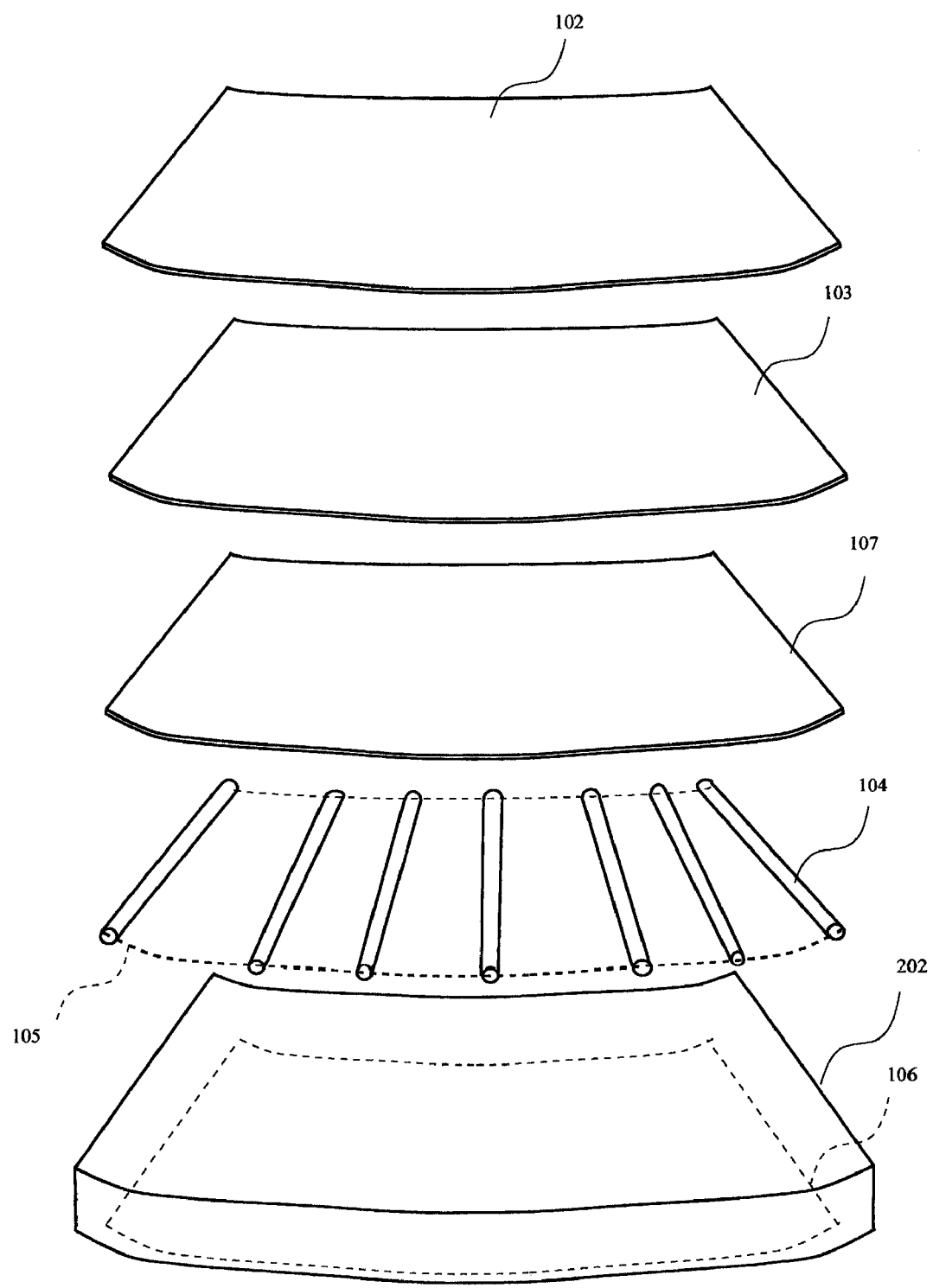
FIG. 2 illustrates a backlight for a liquid-crystal display device having a concavely curved liquid-crystal panel according to Embodiment 1 and shows a diagrammatic exploded view of a liquid-crystal panel 102, an optical sheet 103, a scattering plate 107, a cold cathode luminescent lamp 104 and a backlight unit frame 202, which serve as its principal components.

FIG. 2 illustrates a backlight for a liquid-crystal display device having a concavely curved liquid-crystal panel according to Embodiment 1 and is a diagrammatic exploded view of the liquid-crystal panel 102, the optical sheet 103, the scattering plate 107, the cold cathode luminescent lamps 104 and the backlight unit's frame 202, which are its principal components. The reflective sheet 106 is provided on the backlight unit's frame 202.

The liquid-crystal panel 102 has a concavely curved shape, and the optical sheet 103 and the surface 105 including the tube center axes of the cold cathode luminescent lamps have the same concavely curved shape as the liquid-crystal panel 102. The liquid-crystal panel 102, the optical sheet 103, the scattering plate 107 and the surface 105 including the tube center axes of the cold cathode luminescent lamps 104 are parallel to each other.

By arranging the liquid-crystal panel 102, the optical sheet 103, the scattering plate 107 and the surface 105 including the tube center axes of the cold cathode luminescent lamps parallel to each other, the distance between the screen and the cold cathode luminescent lamps 104 is the same at all portions of the liquid-crystal panel 102, and it becomes possible to make the brightness of the screen uniform.

EMBODIMENT 2

Figure 3:
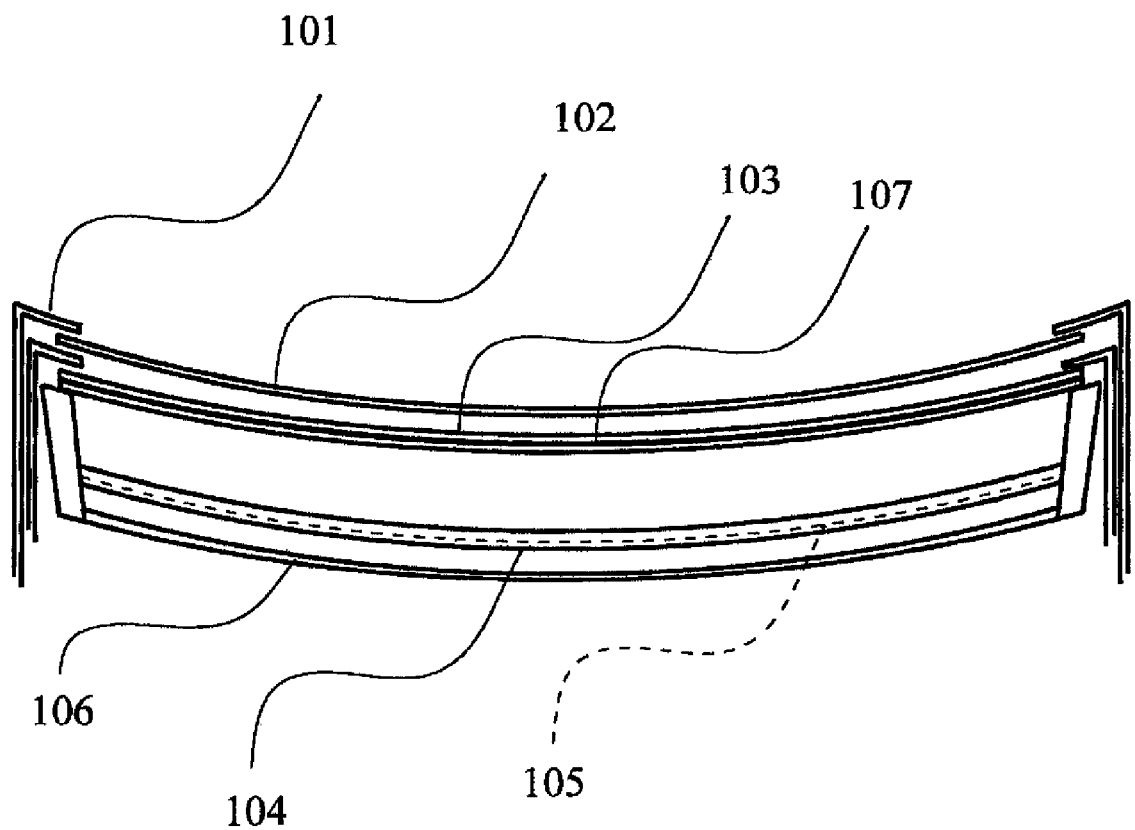
FIG. 3 is a diagrammatic sectional view illustrating the structure of a backlight for a liquid-crystal display device having a concavely curved liquid-crystal panel according to Embodiment 2.

FIG. 3 is a diagrammatic sectional view illustrating the structure of a direct backlight for a liquid-crystal display device having a concavely curved panel according to Embodiment 2.

In FIG. 3, numeral 104 denotes cold cathode luminescent lamps. Furthermore, numeral 105 denotes a surface including the tube center axes of the cold cathode luminescent lamps 104.

Figure 4:
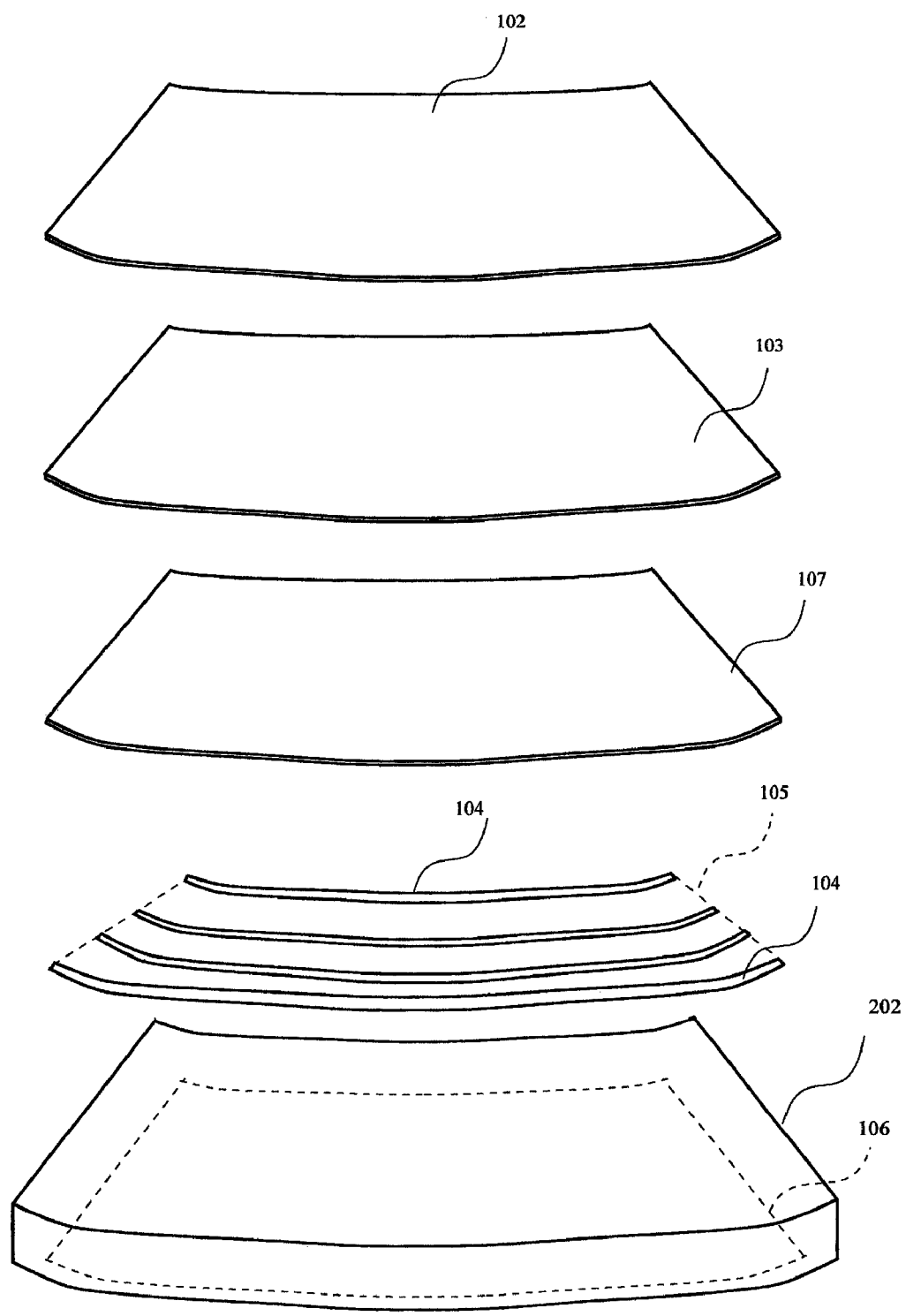
FIG. 4 illustrates a backlight for a liquid-crystal display device having a concavely curved liquid-crystal panel according to Embodiment 2 and shows a diagrammatic exploded view of a liquid-crystal panel 102, an optical sheet 103, a scattering plate 107, cold cathode luminescent lamps 104 and a backlight unit's frame 202, which serve as its principal components.

FIG. 4 illustrates the structure of a backlight for a liquid-crystal display device having a concavely curved liquid-crystal panel according to Embodiment 2 and is a diagrammatic exploded view of the liquid-crystal panel 102, the optical sheet 103, the scattering plate 107, the cold cathode luminescent lamps 104 and the backlight unit's frame 202, which are its principal components.

The cold cathode luminescent lamps 104 have the same concavely curved shape as the curved liquid-crystal panel 102. Furthermore, as shown in FIG. 4, a plurality of the cold cathode luminescent lamps 104 are arranged next to each other, parallel to the curved edges of the liquid-crystal panel 102. The cold cathode luminescent lamps 104 are arranged such that the surface 105 including the tube center axes of the cold cathode luminescent lamps 104 is parallel to the liquid-crystal panel 102 and the optical sheet 103.

As in the backlight used for the liquid-crystal display device having a concavely curved panel according to Embodiment 1, by arranging the liquid-crystal panel 102, the optical sheet 103, and the surface 105 including the tube center axes of the cold cathode luminescent lamps parallel to each other, the distance between the screen and the cold cathode luminescent lamps 104 is the same at all portions of the liquid-crystal panel 102, and it becomes possible to make the brightness of the screen uniform.

EMBODIMENT 3

Figure 5:
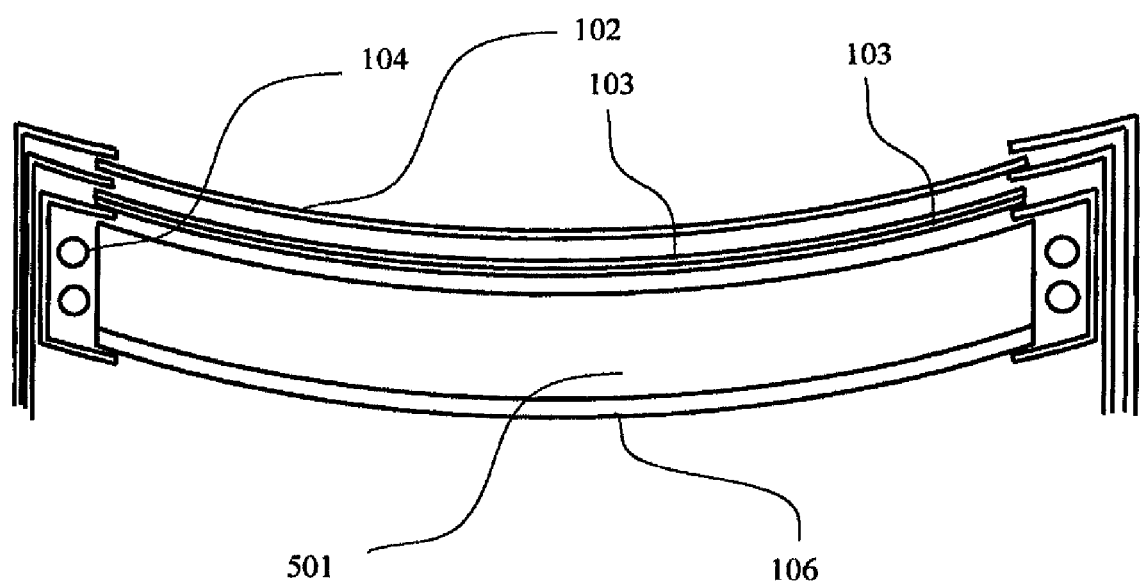
FIG. 5 is a diagrammatic sectional view illustrating the structure of a backlight for a liquid-crystal display device having a concavely curved liquid-crystal panel according to Embodiment 3.

FIG. 5 is a diagrammatic sectional view illustrating the structure of a side backlight for a liquid-crystal display device having a concavely curved liquid-crystal panel according to Embodiment 3.

In FIG. 5, numeral 104 denotes cold cathode luminescent lamps and numeral 501 denotes a light-conductive plate.

Figure 11:
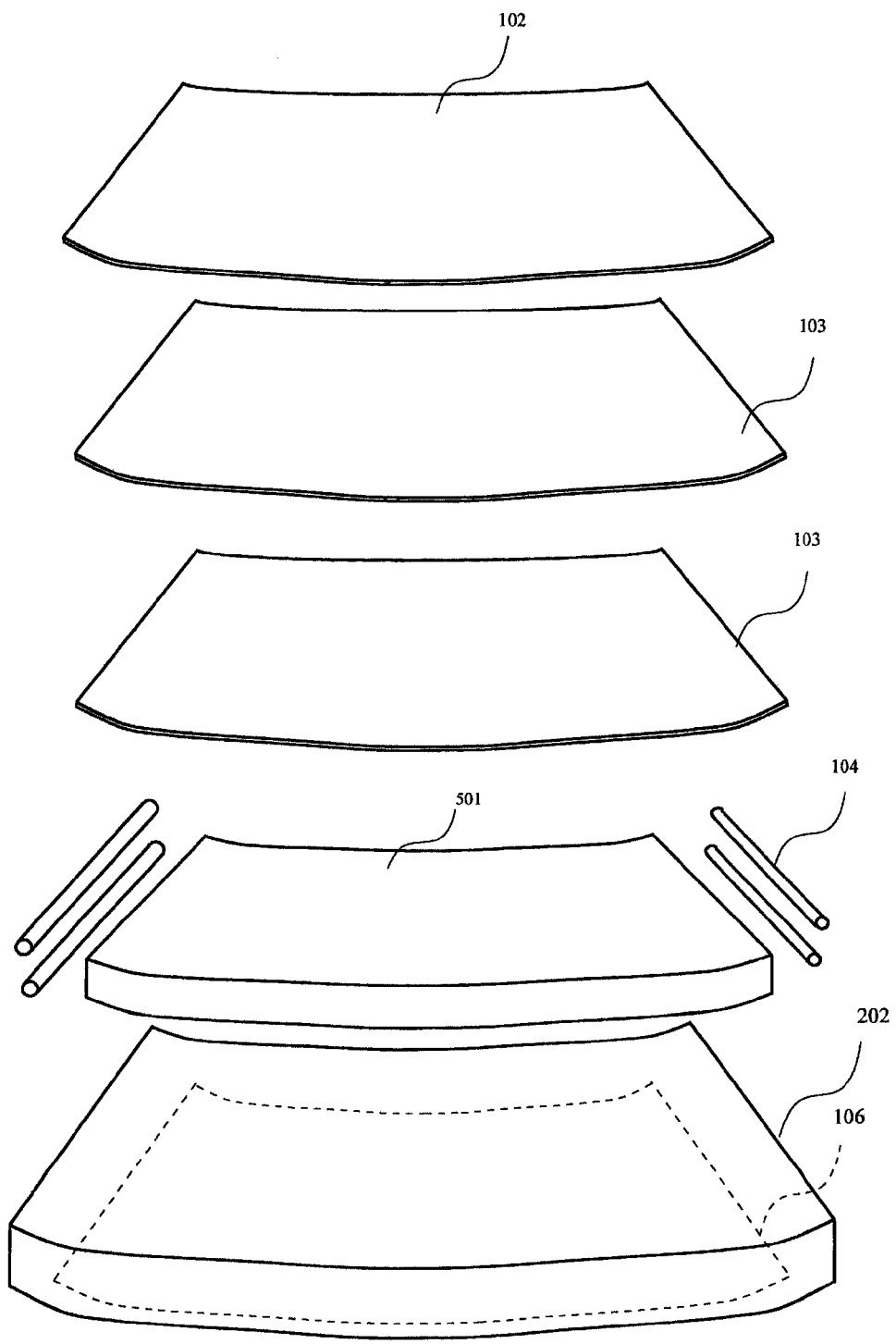
FIG. 11 illustrates the structure of a backlight for a liquid-crystal display device having a concavely curved liquid-crystal panel according to Embodiment 3 and shows a diagrammatic exploded view of a liquid-crystal panel 102, an optical sheet 103, a light-conductive plate 501, cold cathode luminescent lamps 104 and a backlight unit's frame 202, which serve as its principal components.

FIG. 11 illustrates a backlight used for the liquid-crystal display device having a concavely curved liquid-crystal panel according to Embodiment 3 and is a diagrammatic exploded view of the liquid-crystal panel 102, the optical sheets 103, the light-conductive plate 501, the cold cathode luminescent lamps 104 and the backlight unit's frame 202, which are its principal components. It should be noted that in this Embodiment 3, two optical sheets 103 are used, but also in the other embodiments, there is no particular limitation to the number of optical sheets, and the number of optical sheets can be chosen as appropriate.

In the backlight used for the liquid-crystal display device having the concavely shaped liquid-crystal panel according to Embodiment 3, the light-conductive plate 501 of the backlight unit has the same concavely curved shape as the concavely curved panel, and the cold cathode luminescent lamps 104 have a straight tubular shape and are arranged on both sides of the light-conductive plate 501. By arranging the cold cathode luminescent lamps 104 in this manner, the light emitted from the cold cathode luminescent lamps 104 is guided by the light-conductive plate 501 to the screen of the liquid-crystal panel 102, and the brightness can be adjusted with the light-conductive plate 501 to be uniform anywhere on the screen of the liquid-crystal panel 102. It should be noted that in Embodiment 3, the cold cathode luminescent lamps 104 have a straight tubular shape and are arranged on both sides of the light-conductive plate 501, but it is also possible to arrange them only on one side instead of on both sides.

EMBODIMENT 4

Figure 6:
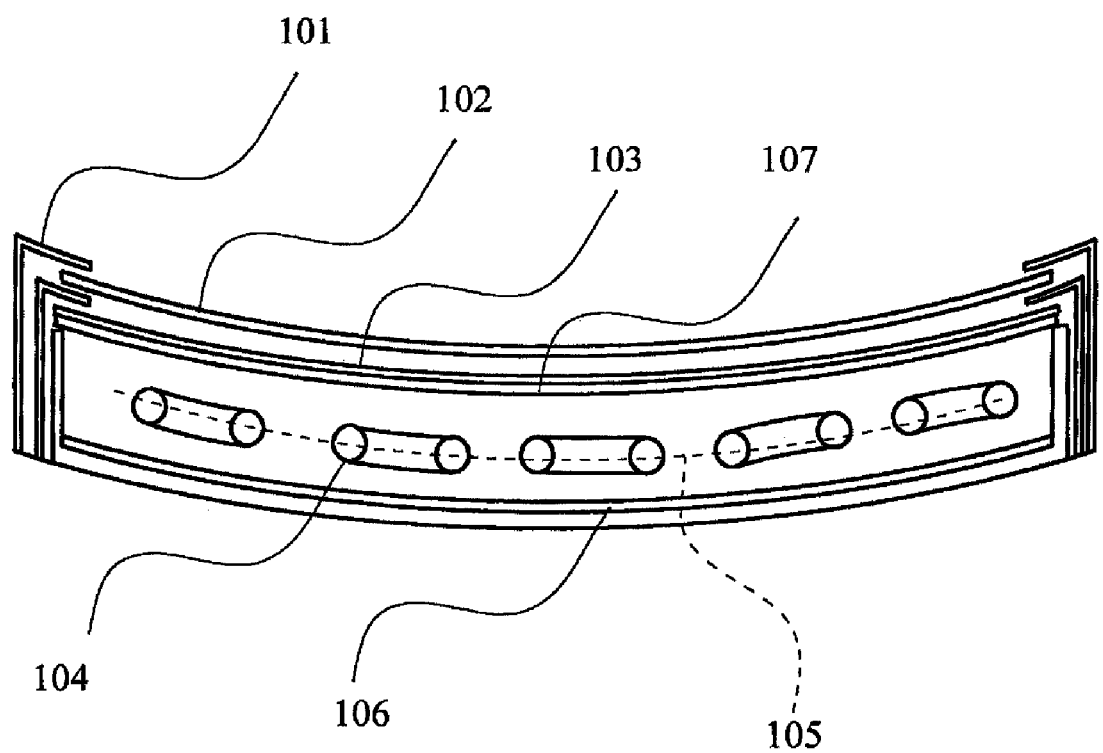
FIG. 6 is a diagrammatic sectional view illustrating the structure of a backlight for a liquid-crystal display device having a concavely curved liquid-crystal panel according to Embodiment 4.

FIG. 6 is a diagrammatic sectional view illustrating the structure of a direct backlight for a liquid-crystal display device having a concavely curved liquid-crystal panel according to Embodiment 4. In the backlight used for the liquid-crystal display device having a concavely curved liquid-crystal panel according to Embodiment 4, the cold cathode luminescent lamps 104 of the backlight used for the liquid-crystal display device do not have a straight tubular shape as in Embodiment 1 but U-shaped tubes, which are arranged such that their connector portions are on the upper side when the liquid-crystal display device is actually used.

Figure 7:
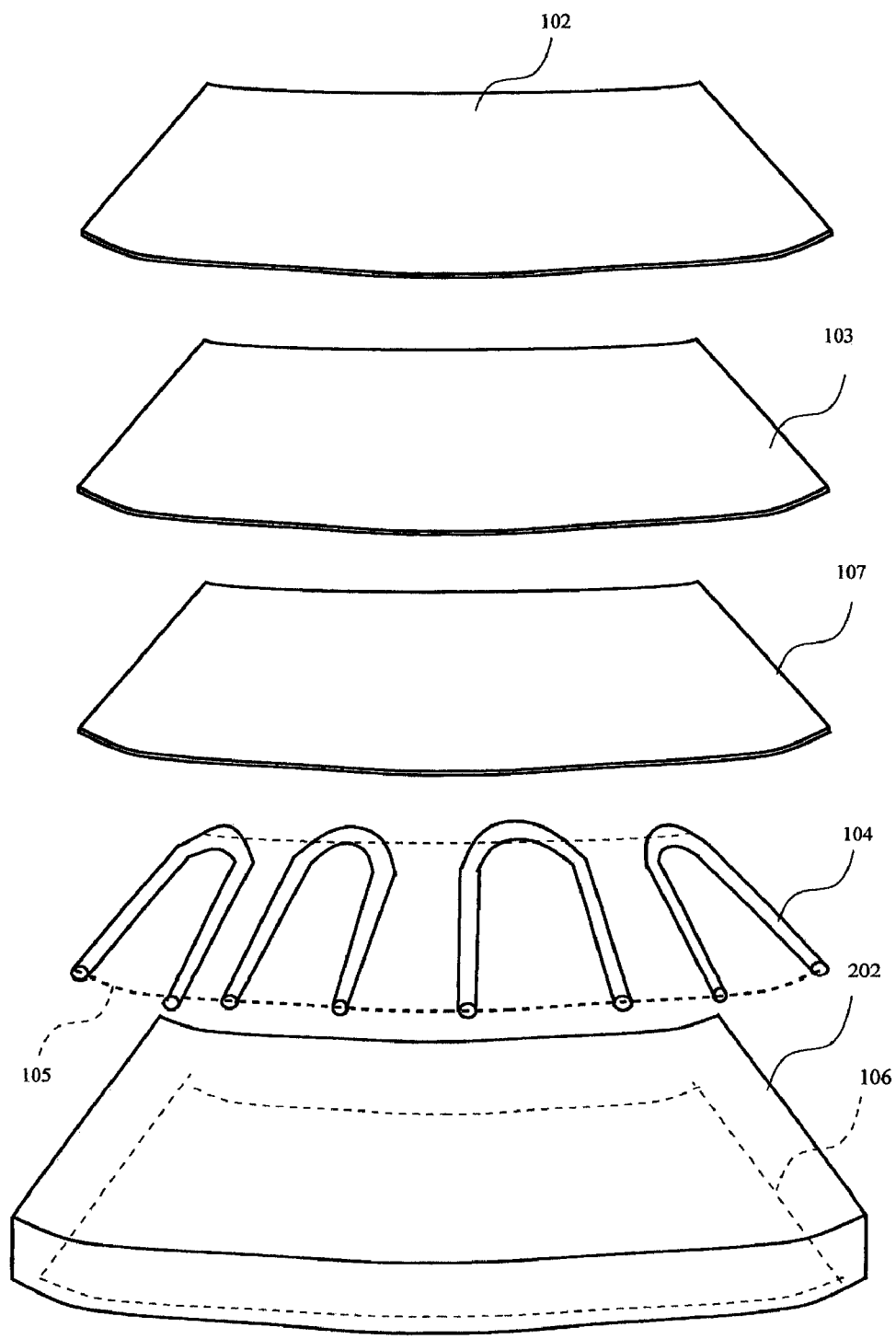
FIG. 7 illustrates the structure of a backlight for a liquid-crystal display device having a concavely curved liquid-crystal panel according to Embodiment 4 and shows a diagrammatic exploded view of a liquid-crystal panel 102, an optical sheet 103, a scattering plate 107, cold cathode luminescent lamps 104 and a backlight unit's frame 202, which serve as its principal components.
Figure 8A:
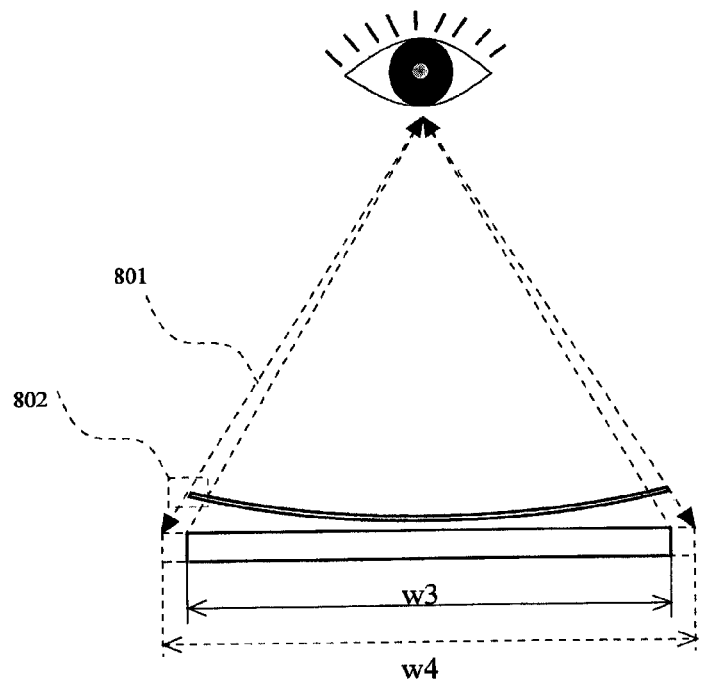
FIG. 8 is a diagrammatic cross-sectional view showing the relation between the line of sight of a viewer observing the two edges of a concavely curved liquid-crystal panel and the horizontal width of the backlight.
Figure 8B:
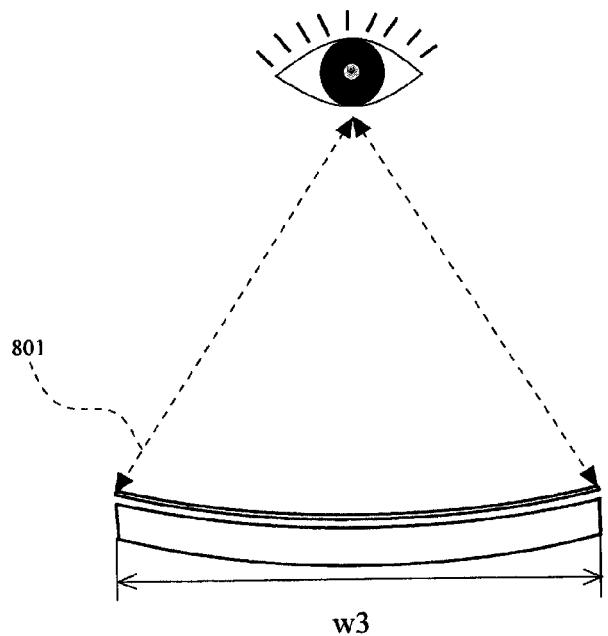

FIG. 7 illustrates the structure of a backlight used for the liquid-crystal display device having a concavely curved liquid-crystal panel according to Embodiment 4 and is a diagrammatic exploded view of the liquid-crystal panel 102, the optical sheet 103, the scattering plate 107, the cold cathode luminescent lamps 104 and the backlight unit's frame 202, which are its principal components.

As in the case of cold cathode luminescent lamps 104 with straight tubes, the surface including the tube center axes is arranged to be parallel to the liquid-crystal panel 102.

Also in this configuration, as in the backlight for a liquid-crystal display device having a concavely curved panel according to Embodiment 1, by arranging the liquid-crystal panel 102, the optical sheet 103, and the surface 105 including the tube center axes of the cold cathode luminescent lamps parallel to each other, the distance between the screen and the cold cathode luminescent lamps 104 is the same at all portions of the liquid-crystal panel 102, and it becomes possible to make the brightness of the screen uniform.

By letting the connectors face upward, different to the backlight used for the liquid-crystal display device having a concavely curved panel according to Embodiment 1, the fact that mercury accumulates around the connectors is improved, and the lifetime of the cold cathode luminescent lamps 104 is improved.

EMBODIMENT 5

Figure 9:
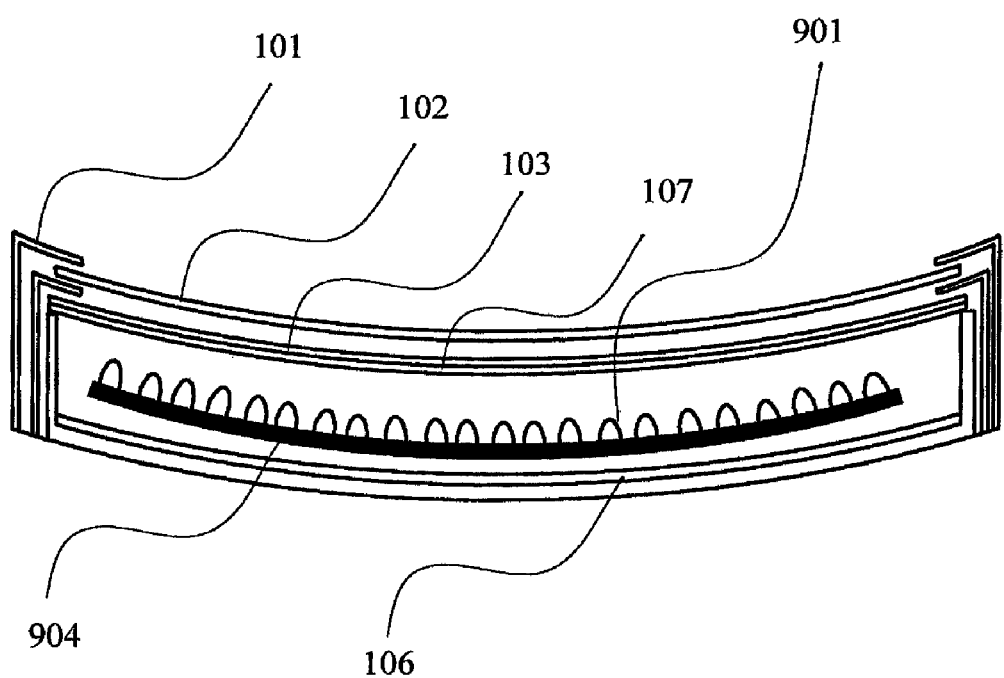
FIG. 9 is a diagrammatic sectional view illustrating the structure of a direct backlight for a liquid-crystal display device having a concavely curved liquid-crystal panel according to Embodiment 5.

FIG. 9 is a diagrammatic sectional view illustrating the structure of a direct backlight for a liquid-crystal display device having a concavely curved panel according to Embodiment 5. Instead of the cold cathode luminescent lamps 104, which are the light source of the backlight according to Embodiment 1, the backlight according to Embodiment 5 uses an LED surface light source as the light source.

In FIG. 9, numeral 904 denotes the LED surface light source. Furthermore, in FIG. 9, numeral 101 denotes a bezel, numeral 102 denotes a liquid-crystal panel, numeral 106 denotes a reflective sheet, numeral 107 denotes a scattering plate and numeral 103 denotes an optical sheet.

Figure 10:
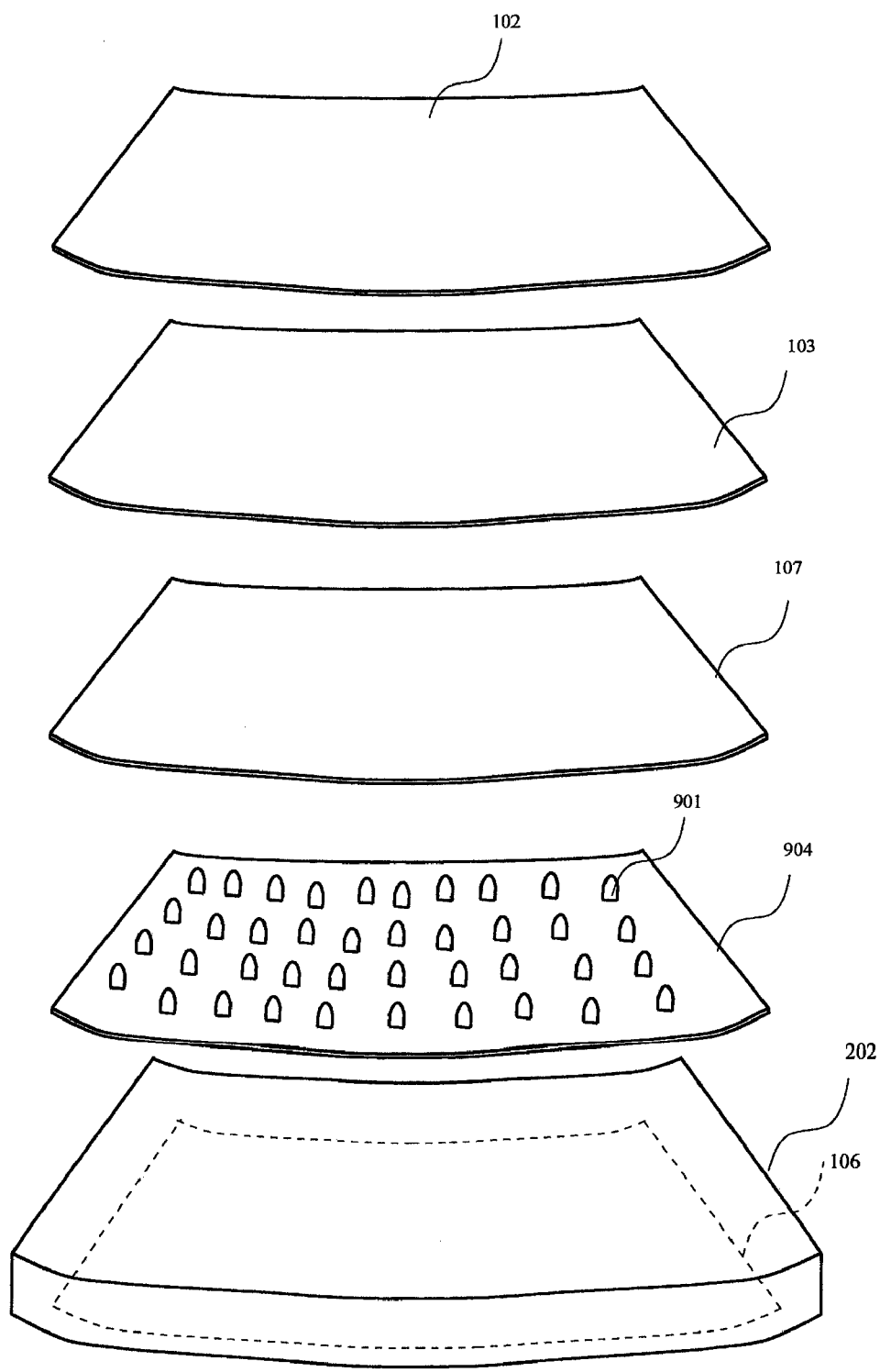
FIG. 10 illustrates a backlight for a liquid-crystal display device having a concavely curved liquid-crystal panel according to Embodiment 5 and shows a diagrammatic exploded view of a liquid-crystal panel 102, an optical sheet 103, a scattering plate 107, an LED surface light source 904 and a backlight unit's frame 202, which serve as its principal components.

FIG. 10 illustrates the backlight used for the liquid-crystal display device having a concavely curved liquid-crystal panel according to Embodiment 5 and is a diagrammatic exploded view of the liquid-crystal panel 102, the optical sheet 103, the scattering plate 107, the LED surface light source 904 and the backlight unit's frame 202, which are its principal components.

The liquid-crystal panel 102 has a concavely curved shape, and the optical sheet 103 and the LED surface light source 904 have the same concavely curved shape as the liquid-crystal panel 102. The liquid-crystal panel 102, the optical sheet 103 and the LED surface light source 904 are parallel to each other.

By arranging the liquid-crystal panel 102, the optical sheet 103 and the LED surface light source 904 parallel to each other, the distance between the screen and the LED surface light source 904 is the same at all portions of the liquid-crystal panel 102, and it becomes possible to make the brightness of the screen uniform. And by providing an LED surface light source as the light source, it is possible to attain the effect of energy savings.

EMBODIMENT 6

Figure 12:
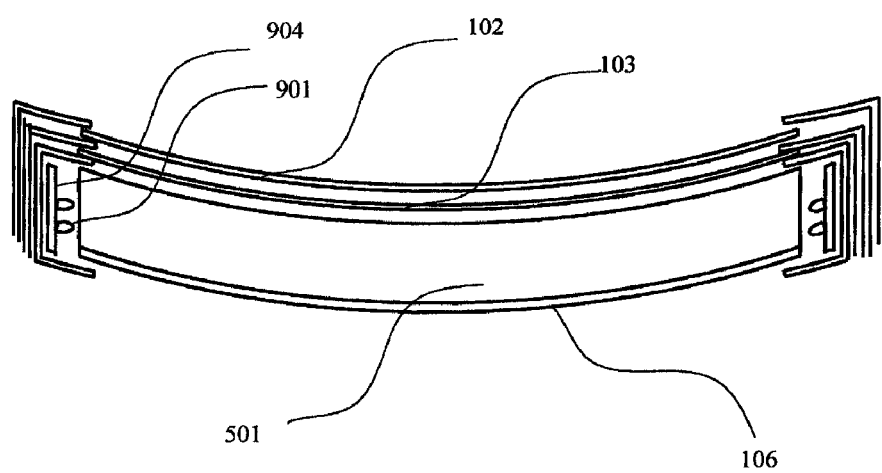
FIG. 12 is a diagrammatic sectional view illustrating the structure of a side backlight for a liquid-crystal display device having a concavely curved liquid-crystal panel according to Embodiment 6.
Figure 13:
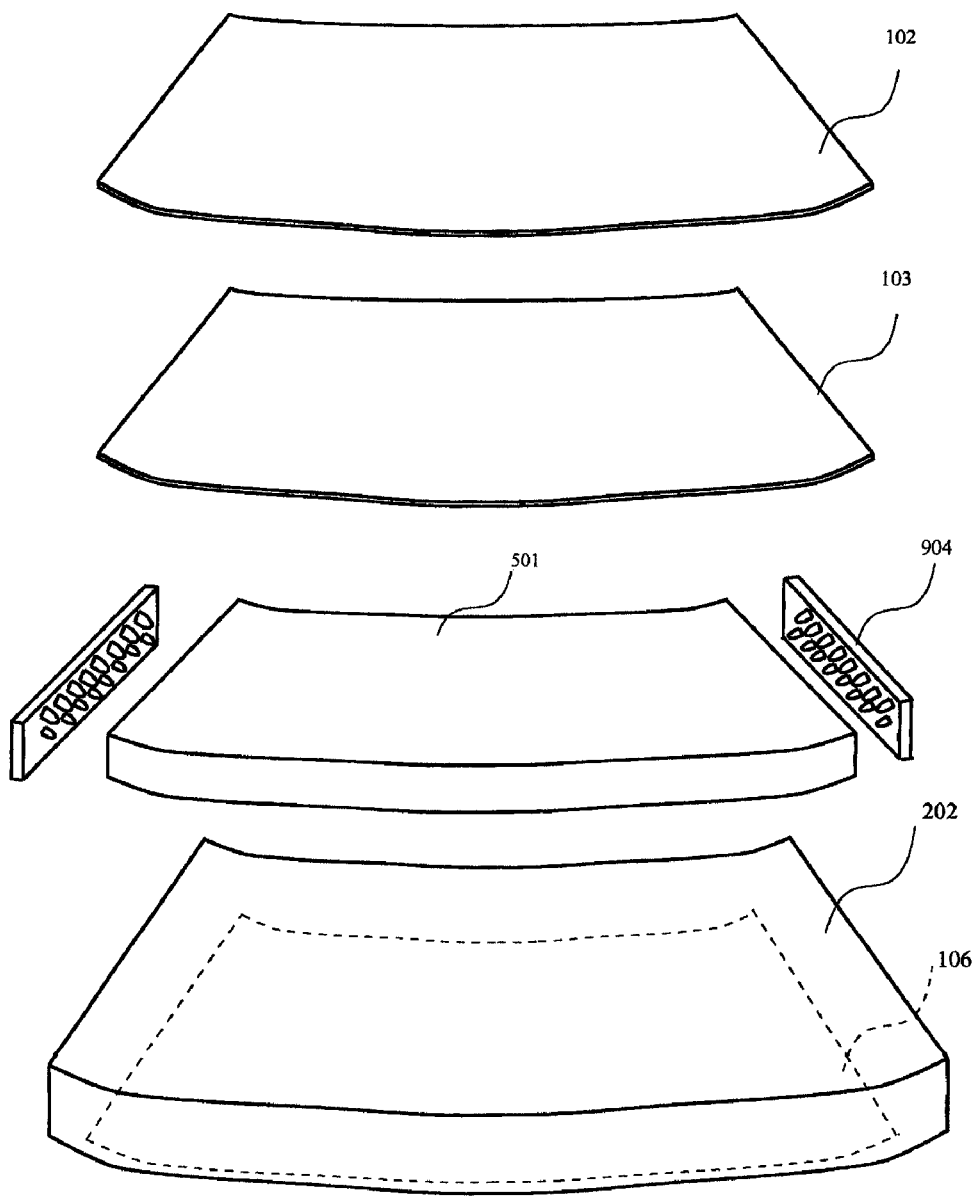
FIG. 13 illustrates a backlight for a liquid-crystal display device having a concavely curved liquid-crystal panel according to Embodiment 6 and shows a diagrammatic exploded view of a liquid-crystal panel 102, an optical sheet 103, a light-conductive plate 501, an LED surface light source 904 and a backlight unit's frame 202, which serve as its principal components.

FIG. 12 is a diagrammatic sectional view illustrating the structure of a side backlight for a liquid-crystal display device having a concavely curved panel according to Embodiment 6. In FIG. 12, numeral 904 denotes planar LED surface light sources, numeral 901 denotes LEDs and numeral 501 denotes a light-conductive plate. FIG. 13 illustrates the backlight used for the liquid-crystal display device having a concavely curved liquid-crystal panel according to Embodiment 6 and is a diagrammatic exploded view of the liquid-crystal panel 102, the optical sheet 103, the light-conductive plate 501, the LED surface light sources 904 and the backlight unit's frame 202, which are its principal components.

In the backlight used for the liquid-crystal display device having a concavely curved liquid-crystal panel according to Embodiment 6, the shape of the light-conductive plate 501 of the backlight unit is substantially the same concavely curved shape as that of the concavely curved panel, and the planar LED surface light sources 904 are arranged on both sides of the light-conductive plate 501. By arranging the LED surface light sources 904 in this manner, the light emitted from the planar LED surface light sources 904 uniformly reaches the screen of the liquid-crystal panel 102 while being adjusted by the light-conductive plate 501.

It should be noted that in Embodiment 6, the planar LED surface light sources 904 are arranged on both sides of the light-conductive plate 501, but it is also possible to arrange them only on one side instead of on both sides.

What is claimed is:

1. A direct backlight unit for a liquid-crystal display device having a concavely curved panel, the backlight unit comprising:
   a frame contoured to substantially match the concavely curved form of the display-device panel;
   a surface light source mounted on a front side of said frame and being of concavely curved form substantially matching that of the display-device panel;
   a scattering plate provided over said surface light source and being of concavely curved form substantially matching that of the display-device panel;
   an optical sheet provided over said scattering plate and being of concavely curved form substantially matching that of the display-device panel; and
   a reflective sheet attached to a back side of said frame, therein being contoured to substantially match the concavely curved form of the display-device panel; wherein
   the concavely curved display-device panel, said frame, said surface light source, said scattering plate, said optical sheet, and said reflective sheet are parallel to one another.

2. A direct backlight unit for a liquid-crystal display device having a concavely curved panel, the backlight unit comprising:
   a frame contoured to substantially match the concavely curved form of the display-device panel;
   a light source arranged in said direct backlight unit, said light source including a plurality of tubular cold-cathode luminescent lamps arranged so that a surface containing the tube center axes of the cold-cathode luminescent lamps is parallel to said concavely curved panel;
   a scattering plate provided over said surface light source and being of concavely curved form substantially matching that of the display-device panel;
   an optical sheet provided over said scattering plate and being of concavely curved form substantially matching that of the display-device panel; and
   a reflective sheet attached to a back side of said frame, therein being contoured to substantially match the concavely curved form of the display-device panel; wherein
   the concavely curved display-device panel, said frame, said lamp-tube center-axis containing surface, said scattering plate, said optical sheet, and said reflective sheet are parallel to one another.

3. The direct backlight unit according to claim 2, wherein:
   the cold-cathode luminescent lamps have a straight tubular shape; and
   the cold-cathode luminescent lamps are arranged parallel to lateral edges of the concavely curved panel that are not curved.

4. The direct backlight unit according to claim 2, wherein:
   the cold-cathode luminescent lamps are U-shaped; and
   the cold-cathode luminescent lamps are arranged parallel to lateral edges of the concavely curved panel that are not curved.

5. The direct backlight unit according to claim 2, wherein the cold-cathode luminescent lamps are curved like the concavely curved panel; and arranged parallel to lateral edges of the concavely curved panel that are curved.

6. A direct backlight unit for a liquid-crystal display device having a concavely curved panel, the backlight unit comprising:
- a frame contoured to substantially match the concavely curved form of the display-device panel;
- an LED surface light source mounted on a front side of said frame and being of concavely curved form substantially matching that of the display-device panel;
- a scattering plate provided over said surface light source and being of concavely curved form substantially matching that of the display-device panel;
- an optical sheet provided over said scattering plate and being of concavely curved form substantially matching that of the display-device panel; and
- a reflective sheet attached to a back side of said frame, therein being contoured to substantially match the concavely curved form of the display-device panel; wherein
- the concavely curved display-device panel, said frame, said LED surface light source, said scattering plate, said optical sheet, and said reflective sheet are parallel to one another.

7. The direct backlight unit according to claim 1, wherein the surface light source comprises a xenon lamp.

8. A liquid-crystal display device comprising:
- a concavely curved panel;
- a direct backlight unit arranged rearward of said concavely curved panel;
- a surface light source arranged in said direct backlight unit to be parallel to said concavely curved panel; and
- a bezel, said bezel having retaining portions holding non-curved lateral edges of said concavely curved panel, and being of concavely curved form substantially matching that of said concavely curved panel.

9. The direct backlight unit according to any of the claims 1, 2, 3, 4, 5, 6 or 7, further comprising a bezel, said bezel having retaining portions holding non-curved lateral edges of said concavely curved panel, and being of concavely curved form substantially matching that of said concavely curved panel.

10. A side backlight unit for a liquid-crystal display device having a concavely curved panel, the backlight unit comprising:
- a frame contoured to substantially match the concavely curved form of the display-device panel;
- a light-conductive plate mounted on a front side of said frame and being of concavely curved form substantially matching that of the display-device panel;
- a light source including a straight tubular cold-cathode luminescent lamp arranged along a side portion of the light-conductive plate;
- a scattering plate provided over said surface light source and being of concavely curved form substantially matching that of the display-device panel;
- an optical sheet provided over said scattering plate and being of concavely curved form substantially matching that of the display-device panel; and
- a reflective sheet attached to a back side of said frame, therein being contoured to substantially match the concavely curved form of the display-device panel; wherein
- the concavely curved display-device panel, said frame, said light-conductive plate, said scattering plate, said optical sheet, and said reflective sheet are parallel to one another.

11. A side backlight unit for a liquid-crystal display device having a concavely curved panel, the backlight unit comprising:
- a frame contoured to substantially match the concavely curved form of the display-device panel;
- a light-conductive plate mounted on a front side of said frame and being of concavely curved form substantially matching that of the display-device panel;
- a planar LED surface light source arranged along a side portion of the light-conductive plate;
- a scattering plate provided over said surface light source and being of concavely curved form substantially matching that of the display-device panel;
- an optical sheet provided over said scattering plate and being of concavely curved form substantially matching that of the display-device panel; and
- a reflective sheet attached to a back side of said frame, therein being contoured to substantially match the concavely curved form of the display-device panel; wherein
- the concavely curved display-device panel, said frame, said light-conductive plate, said scattering plate, said optical sheet, and said reflective sheet are parallel to one another.

* * * * *